US011971745B2

(12) United States Patent
Zadvinskis et al.

(10) Patent No.: US 11,971,745 B2
(45) Date of Patent: Apr. 30, 2024

(54) COMPUTER CASE WITH INTEGRATED TILT STAND

(71) Applicants: Mark Zadvinskis, Saline, MI (US); Adam Ostroff, West Bloomfield, MI (US)

(72) Inventors: Mark Zadvinskis, Saline, MI (US); Adam Ostroff, West Bloomfield, MI (US)

(73) Assignee: SHAUN JACKSON DESIGN, INC., Saline, MI (US)

(*) Notice: Subject to any disclaimer, the term of this patent is extended or adjusted under 35 U.S.C. 154(b) by 0 days.

(21) Appl. No.: 17/955,722

(22) Filed: Sep. 29, 2022

(65) Prior Publication Data

US 2023/0213968 A1 Jul. 6, 2023

Related U.S. Application Data

(60) Provisional application No. 63/249,774, filed on Sep. 29, 2021.

(51) Int. Cl.
*G06F 1/16* (2006.01)
(52) U.S. Cl.
CPC ............ *G06F 1/1628* (2013.01); *G06F 1/166* (2013.01); *G06F 2200/1633* (2013.01)
(58) Field of Classification Search
CPC ...................................................... G06F 1/166
See application file for complete search history.

(56) References Cited

U.S. PATENT DOCUMENTS

| 4,113,212 | A | * | 9/1978 | Coriden | G06F 15/0216 |
| | | | | | 248/688 |
| 4,618,119 | A | * | 10/1986 | Powell | A47B 23/043 |
| | | | | | 248/456 |
| 5,111,361 | A | * | 5/1992 | Kobayashi | G06F 1/1635 |
| | | | | | 248/677 |
| 5,337,985 | A | * | 8/1994 | Hale | F16M 13/005 |
| | | | | | 248/176.1 |
| 5,732,928 | A | * | 3/1998 | Chang | H01H 13/84 |
| | | | | | 248/676 |
| 5,818,688 | A | * | 10/1998 | Gluskoter | G06F 1/166 |
| | | | | | 248/118.1 |
| 5,918,957 | A | * | 7/1999 | Bovio | G06F 1/166 |
| | | | | | 312/351.6 |

(Continued)

*Primary Examiner* — Adrian S Wilson
(74) *Attorney, Agent, or Firm* — Fishman Stewart PLLC

(57) ABSTRACT

A lightweight, protective case for a laptop computer includes an integrated, fold-out tilt stand. In a transport position, a stand component is received within a designated region such as a recessed cavity on the bottom of a keyboard shell component, and one or more stand retaining members. In a use position, the stand component extends outwardly from the bottom surface of the keyboard shell component, with the stand retaining member(s) in a straightened condition, thereby maintaining the keyboard shell component at an angle relative to a support surface. The stand retaining member(s) may be flexible or hinged, and including a magnetic or other structure for maintaining the stand component against the keyboard shell component when not in use. The upper edge of the stand component and/or the upper end of the stand retaining member may be hingedly affixed with flexible materials that extends through the keyboard shell component.

18 Claims, 5 Drawing Sheets

(56) References Cited

U.S. PATENT DOCUMENTS

| | | | | |
|---|---|---|---|---|
| 6,098,952 A * | 8/2000 | Tonn | F16M 11/10 | 248/688 |
| 6,971,622 B2 * | 12/2005 | Ziegler | H04M 1/12 | 248/455 |
| 7,415,108 B2 * | 8/2008 | Toh | H04M 1/11 | 379/454 |
| 8,172,191 B1 * | 5/2012 | Zimbalatti | F16M 11/10 | 248/688 |
| 8,237,661 B2 * | 8/2012 | Ma | G06F 3/0208 | 345/168 |
| 8,328,153 B2 * | 12/2012 | Yang | F16M 11/10 | 248/370 |
| 8,542,480 B2 * | 9/2013 | Williams | F16M 13/00 | 312/118 |
| 8,544,808 B2 * | 10/2013 | Saad | A47B 91/02 | 248/455 |
| 8,605,431 B2 * | 12/2013 | Cheng | F16M 11/10 | 248/688 |
| 8,800,937 B1 * | 8/2014 | Lee | F16M 11/10 | 248/65 |
| 8,955,815 B2 * | 2/2015 | White | F16M 13/00 | 206/320 |
| 8,960,630 B2 * | 2/2015 | Fu | H04M 1/04 | 248/560 |
| 9,185,954 B2 * | 11/2015 | Cheung | H04B 1/3877 | |
| 9,369,555 B2 * | 6/2016 | Zhang | F16M 11/10 | |
| 9,683,694 B2 * | 6/2017 | Shiba | F16M 11/10 | |
| 9,958,906 B2 * | 5/2018 | Ho | G06F 1/166 | |
| 10,060,574 B2 * | 8/2018 | Zhang | F16M 13/005 | |
| 10,855,821 B1 * | 12/2020 | Chou | H04B 1/3877 | |
| 11,489,950 B2 * | 11/2022 | Chou | H05K 5/0234 | |
| 2010/0051775 A1 * | 3/2010 | Wu | F16M 11/10 | 248/371 |
| 2011/0050063 A1 * | 3/2011 | Wang | H04N 1/00127 | 248/351 |
| 2022/0300033 A1 * | 9/2022 | Zadvinskis | G06F 1/1628 | |

* cited by examiner

COMPUTER CASE WITH INTEGRATED TILT STAND

REFERENCE TO RELATED APPLICATIONS

This application claims priority to, and the benefit of, U.S. Provisional Patent Application Ser. No. 63/249,774, filed Sep. 29, 2021, the entire content of which is incorporated herein by reference.

FIELD OF THE INVENTION

This invention relates generally to portable computer cases and, in particular, to a protective shell system with an integrated stand for a portable computer.

BACKGROUND OF THE INVENTION

There are many different types of cases for laptop computers, including snap-on type shells. There are also protective computer covers that integrate stands to position the device at an angle for use. However, there is an outstanding need for a shell system for portable computers such as laptops that integrates a built-in, lightweight stand.

SUMMARY OF THE INVENTION

This invention improves upon and advances the art by providing a lightweight, protective shell for a laptop computer (or other portable electronic device) that includes an integrated, fold-out stand.

A protective shell for a laptop snaps on both top and bottom portions of the computer (i.e., lower keyboard and upper display portions). A stiff panel on the bottom of the computer shell forms a foot that can be folded out in order to prop up the computer and ultimately raise the height of the screen into a more comfortable and functional position, enhancing the natural viewing angle for the user. When open, the support raises the height of the screen and keyboard. A support connector is also included to adjust or set the height and angle. This reduces neck strain and improves the experience of using the laptop for various purposes, including video conferencing, etc.

The two protective halves may be connected by a fabric strip forming a 'spine' between the two halves. The spine connects to the top of the computer and continues to the bottom, which lays up against the computer when closed.

A case for a portable electronic device having a keyboard portion and a display portion, comprises a display shell component configured to receive the display portion of the device and a keyboard shell component configured to receive the keyboard portion of the device, and wherein the keyboard shell component has a front portion terminating in a front edge, a rear portion terminating in a rear edge, and a bottom surface with a recessed cavity or other defined region.

A stand component is provided with an upper edge, a lower edge, and inner and outer surfaces, and wherein the upper edge of the stand component is hingedly affixed to a bottom rear portion of the keyboard shell component. A stand retaining member is provided having an upper end that is hingedly attached to a region of the keyboard shell component, and a lower end attached to the inner surface of the stand component.

A case constructed in accordance with invention facilitates a transport position and and a use position. In the transport position, the stand component is received within the recessed cavity of the keyboard shell component, with the stand retaining member in a folded state within the cavity, and in the use position, the stand component extends outwardly from the bottom surface of the keyboard shell component, with the stand retaining member in a straightened condition, thereby maintaining the keyboard shell component at an angle relative to a support surface, resting on the front edge of the keyboard shell component and the lower edge of the stand component.

The stand retaining member may be made of a flexible material. Alternatively, the stand retaining member may be constructed from a plurality of rigid or semi-rigid panels, and hinged between the upper and lower ends of the stand retaining member. A plurality of stand retaining members may also be used, for example, a pair of spaced-apart straps.

The display portion of the portable electronic device preferably snaps into the display shell component, and likewise the keyboard portion of the portable electronic device preferably snaps into the keyboard shell component. The keyboard and display shell components may be hinged, with peripheral edges that are similarly sized.

The case may further include a structure for maintaining the stand component within the cavity of the keyboard shell component while in the transport position. In one embodiment the structure is magnetic, using at least one magnet disposed on or in the stand member and at least one magnet of opposite polarity disposed on or in the cavity or recess on the bottom of the keyboard shell component. Alternatively, magnets and magnetically attractive (i.e., ferrous) material(s) may be used in lieu of opposing magnets.

The upper edge of the stand component may be hingedly affixed with a flexible material that extends through the keyboard shell component. The flexible material may at least partially cover an outer surface of the stand component. The upper end of the stand retaining member may hingedly attached with a flexible material that extends through the keyboard shell component. The flexible material may at least partially cover an outer surface of the stand retaining member. If the stand retaining member is hinged, the flexible material may also form the hinge.

The stand component may be rectangular, and the lower edge of the stand component may include a cut out of notch forming a plurality of feet.

DETAILED DESCRIPTION OF THE PREFERRED EMBODIMENTS

Figure 1:
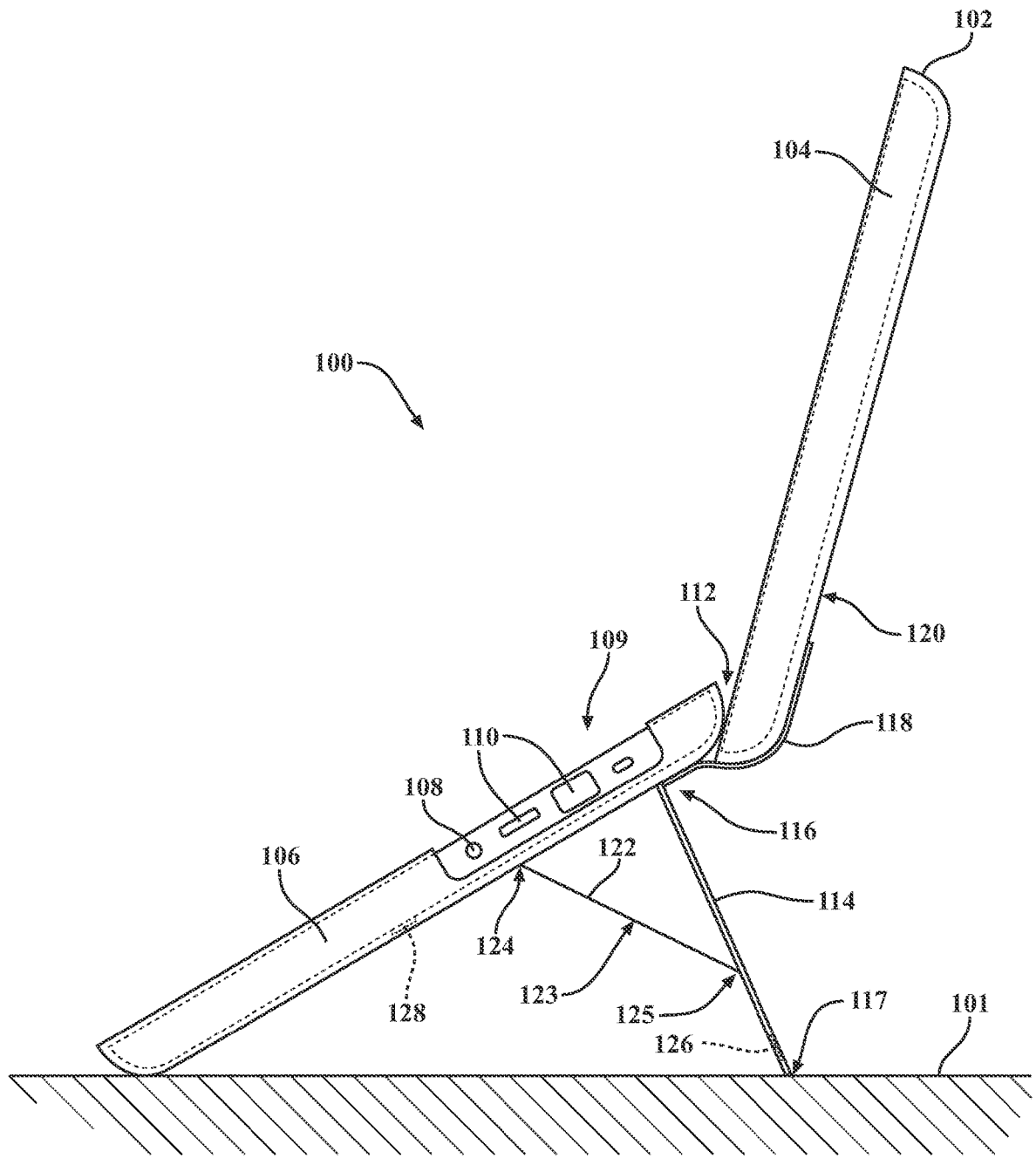
FIG. 1 is a side view of a preferred embodiment of the invention.

Now making reference to the accompanying drawings, FIG. 1 is a side view of a preferred embodiment of the invention shown generally at 100 in conjunction with a laptop computer having a keyboard portion 108 hinged at region 112 to a display portion 104. The invention is not limited in terms of the type or manufacturer of the computer, and indeed is applicable to yet-to-be developed products. In fact, while the invention is described in terms of a two-part shell (interconnected with a flexible hinge described below), the patentably distinct fold-out stand may be used in conjunctions with other (i.e., non-hinged) types of computer cases.

The embodiment shown in FIG. 1 includes an upper shell portion 102 configured to receive a display portion of the computer, and a lower shell portion 106 configured to receive a keyboard portion 108 of the computer. The two portions of the laptop preferably snap into the shell portions with a rim and/or tabs extending at least partially around each shell portion to maintain the two halves of the computer in position. As shown in the drawing, either or both of the upper and lower shell portions 104, 106 may be discontinuous and may include gaps such as 109 so that controls or connectors 110 remain available for use when the shall halves are installed.

The side view of FIG. 1 shows a fold-out support member 114 according to the invention which has an upper edge hinged to the lower shell portion 106 at 116, and a lower edge 117 adapted for contact with a support surface 101 when the support is folded outwardly as shown. A retaining member 122 is used to maintain the support 114 in an angled position as shown. The retaining member 122 includes a first edge 124 hinged at the lower shell portion, and a second edge 125 hinged to the support member 114.

In FIG. 1, the support member 114 and retaining member 122 are shown in their extended positions supporting the computer at a predetermined angle for use. During periods of non-use or transport, the support member 114 and retaining member 122 both fold up and are stowed into the lower surface of the lower shell portion as described below.

Figure 2:
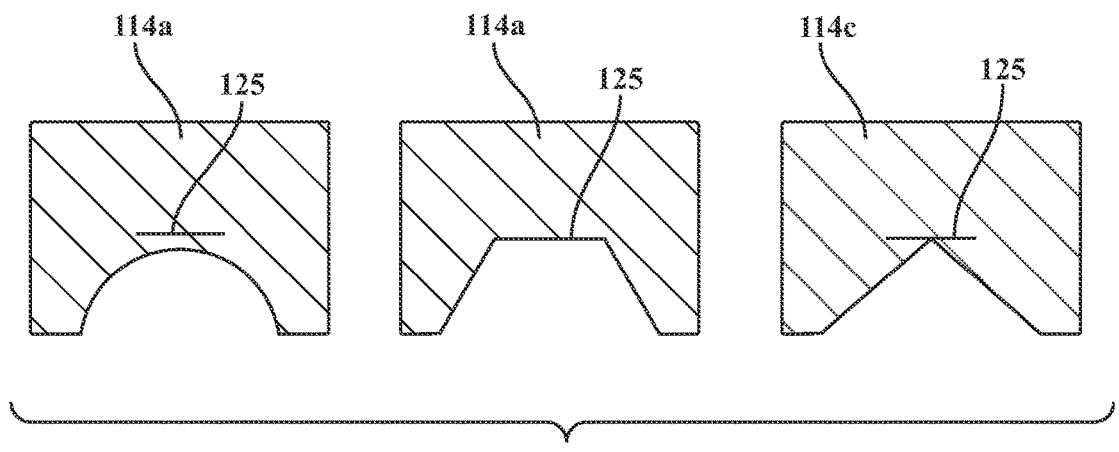
FIG. 2 illustrates alternative shapes, without limitation, for a support member.

In preferred embodiments, the support member 114 is generally rectangular and rigid or semi-rigid. As shown in FIG. 2, other shapes with bottom cut-outs such as 114a-c may alternatively be used for the support member. Retaining member 122 may be flexible, or may be rigid or semi-rigid with a central fold line around region 123 in FIG. 1 enabling the retaining member 122 to fold up into the stowed position.

In preferred embodiments, some type of temporary connection system is used to hold the support member 144 in the stowed position. For example, opposing magnets 126, 128 may be used for this purpose. Other temporary attachment mechanisms such as hook-and-loop type fasteners may alternatively be used.

Figure 3:
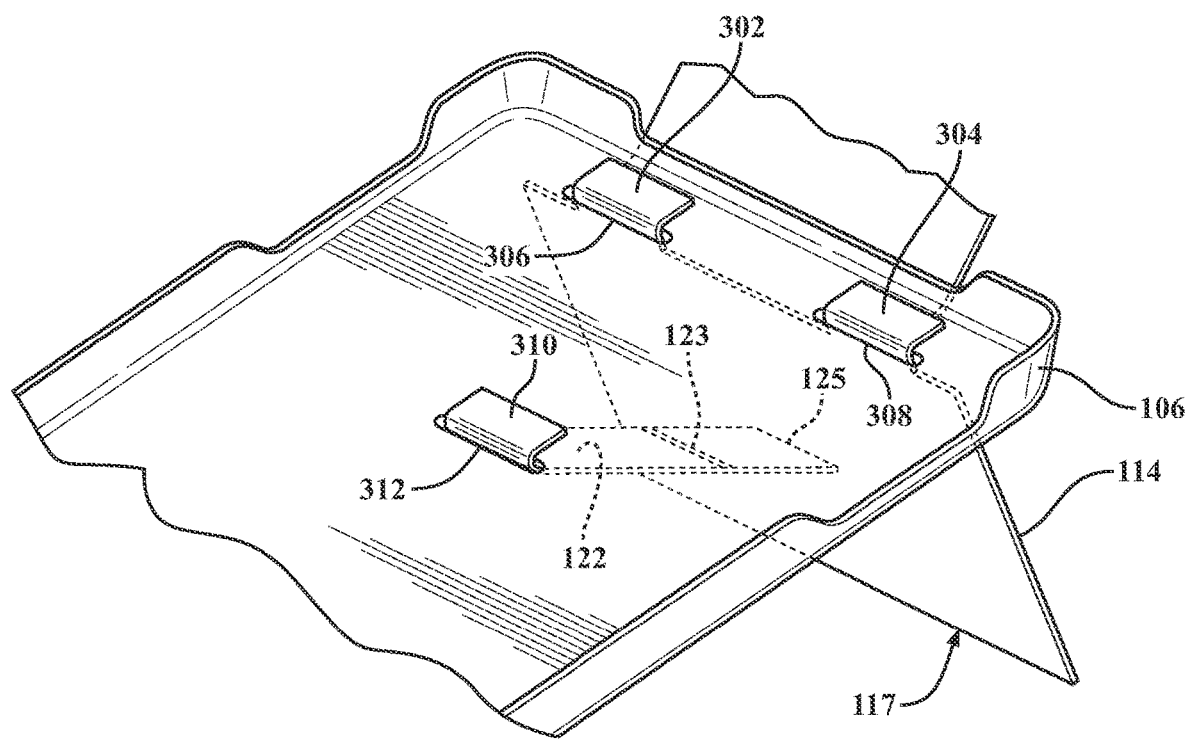
FIG. 3 is an interior view of a lower shell portion indicating the way in which the various members are bonded into position.

FIG. 3 is a detail drawing illustrating the way in which the various components may be configured and connected. As mentioned, support member 114 is preferably rigid or semi-rigid. However, the upper edge of support member 114 transitions to a pair of opposing flexible tabs 302, 304 that extend through slots 306, 308 formed in the bottom of lower shell component 106. While more or fewer tabs/slots may be used, two are used in a preferred embodiment. Member 114 may be made from a thin, lightweight material such as plastic, fiberglass or the like, and may be covered on one or preferably both sides with a flexible material such as a cloth fabric. As such, the fabric may extend beyond the upper edge of the member 114 and transition into integral tabs 302, 304. As used herein, the term "fabric" may be taken to mean any flexible woven or non-woven material, of any color and/or suitable weight.

Similar to the support member 114, retention member 122 may be composed of a flexible material, and extend through a third slot 310 formed in the bottom shell, as shown. If the retention member 122 is made with a pair of rigid panels separated by a hinged region 123, member 122 may likewise be constructed from a thin, lightweight material such as plastic, fiberglass or the like, and covered on one or preferably both sides with a flexible material such as a cloth fabric. As such, the flexible material may extend beyond the upper edge of the member 122 forming tab 310.

Figure 4:
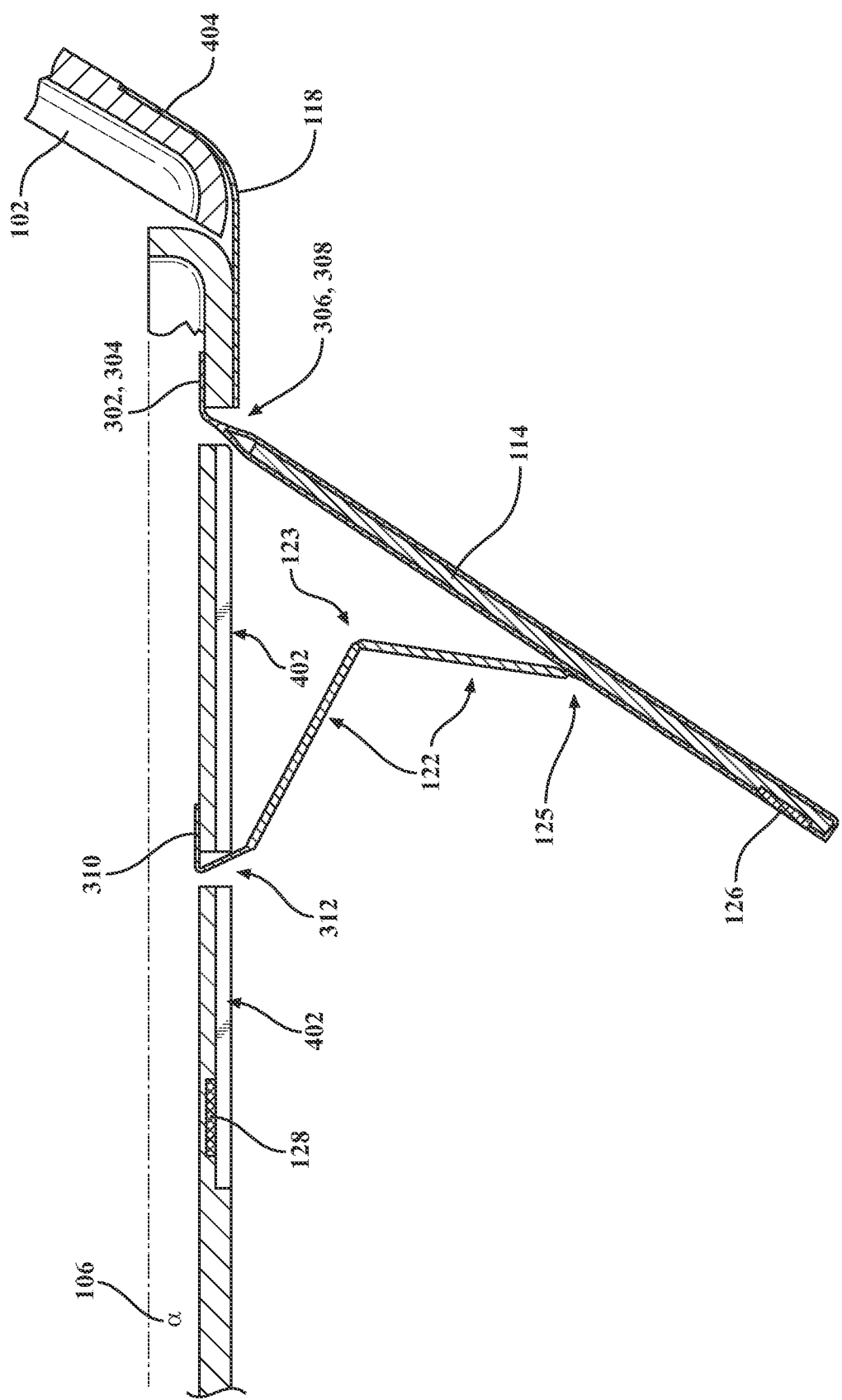
FIG. 4 is a side view with cross sections showing the way in which the foot is folded up and stowed.

FIG. 4 is a detailed cross section showing members 114, 122 in a partially stowed condition. That is, member 114 is partially folded up toward the bottom surface of lower shell portion 106, and retention member 122 is partially bent at 123. As with other drawings referenced herein, FIG. 4 is not necessarily to scale and is primarily used to show functionality. Tabs 302, 304 and 310 are permanently bonded to the bottom inner surface of the lower shell portion 106 using a glue, adhesive, thermal process, mechanical fastener(s), stitching, etc. to form a permanent connection. Flexible material 118 is bonded to the outer surfaces of the lower and upper shell components, preferably within cavities to that the material is flush with the outer surfaces of the shells.

FIG. 4 also shows the use of magnets 126, 128 operative to hold the members 114, 122 within a lower cavity 402 such that the bottom surface of the lower shell portion 106 is smooth or near-smooth when the stand is not in use.

Figure 5A:
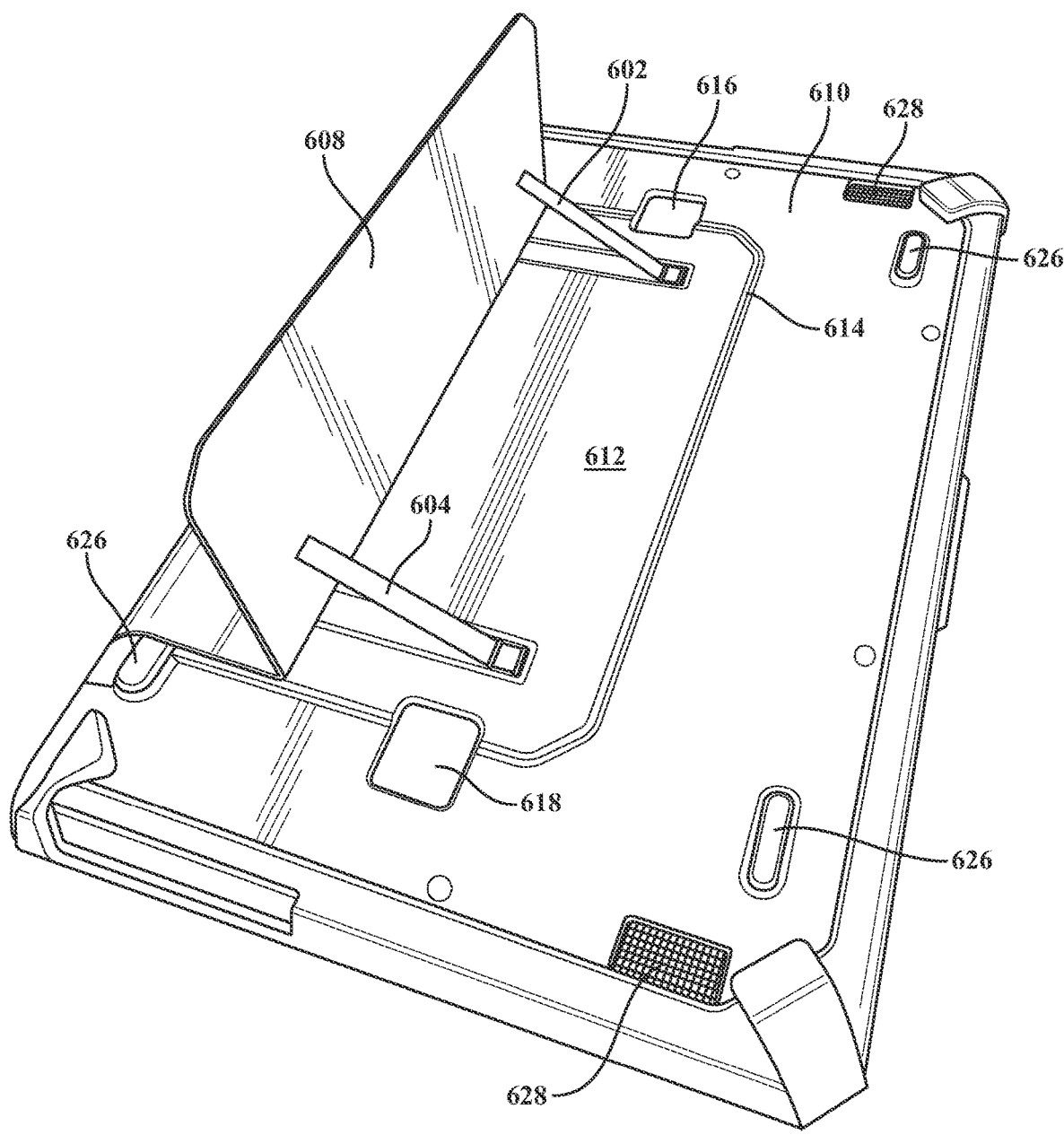
FIG. 5A is a bottom view of an embodiment of the invention using a plurality of stand retaining members.

FIG. 5A is a bottom view of an embodiment of the invention using a plurality of stand retaining members. In particular, the embodiment of FIGS. 5A, B shows a pair of retaining members 602, 604 coupling a stand component 608 to the bottom surface of a keyboard shell component 610. When stowed, stand component 608 is received within a region 612 defined by a raised lip 614. Recesses 616, 618 may be provided to enable a user to grasp the stand component 608 and fold it out for use.

Figure 5B:
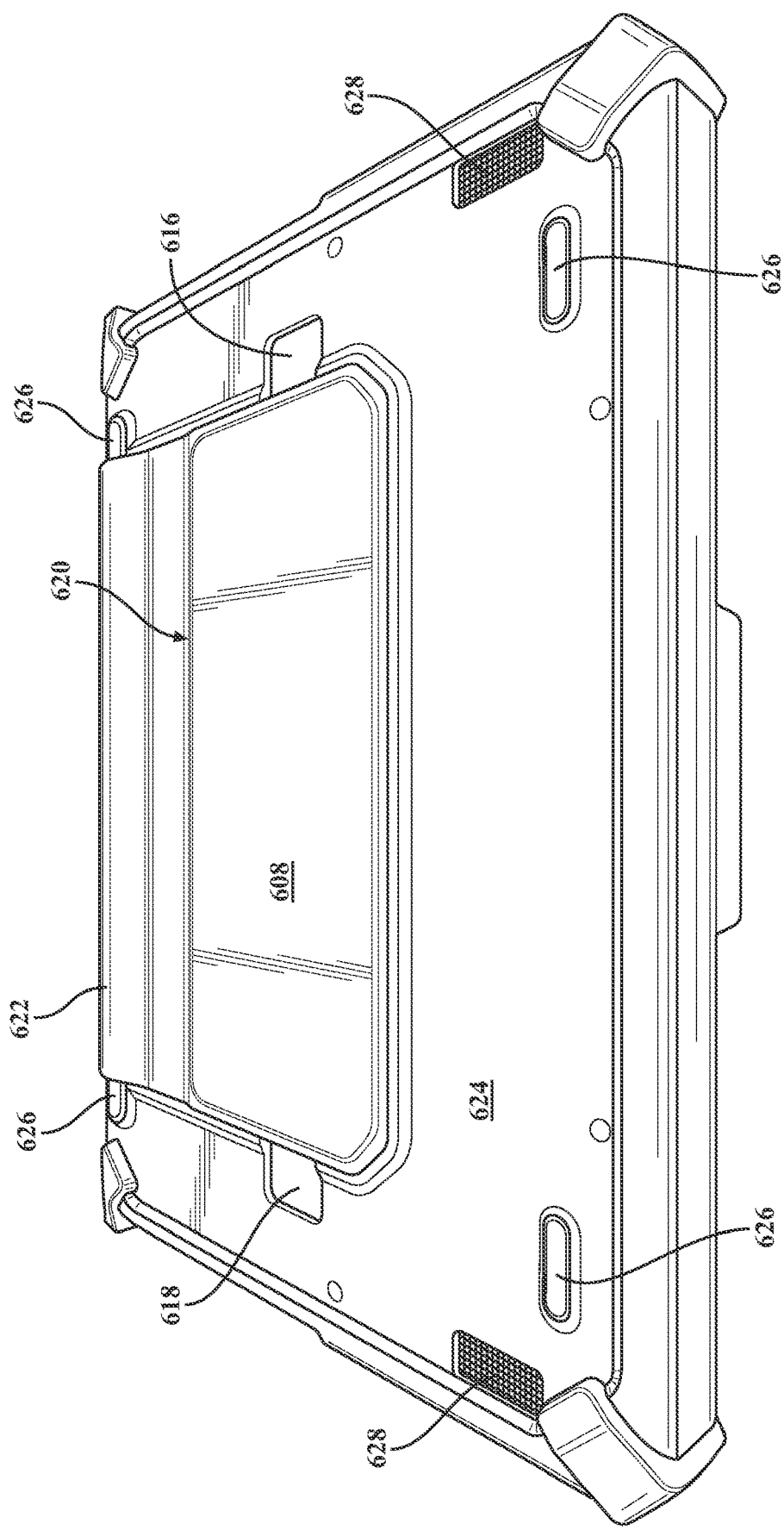
FIG. 5B shows the embodiment of FIG. 6A with the stand component in a stowed condition.

FIG. 5B shows the embodiment of FIG. 5A with the stand component in a stowed condition. Note that in this embodiment a flexible material covers the stand component, and that the material forms two hinges. First, the material is boned in the region 620, forming the hinged for stand component 608, and secondly, the material continues along the rear of the assembly to for a hinge 622 coupling the keyboard shell component 624 to the display shell component (not shown). Note further that the bottom of the keyboard shell component 624 may include integral feet 626 and air vents 628. In addition, only the stand component 608 itself may include a stiffening member seen in FIG. 5B covered by the hinge material.

The invention claimed is:

1. A case for a portable electronic device having a keyboard portion and a display portion, the case comprising:
   a display shell component configured to receive the display portion of the device;
   a keyboard shell component configured to receive the keyboard portion of the device;
   wherein the keyboard shell component has a front portion terminating in a front edge, a rear portion terminating in a rear edge, and a bottom surface with a stand-receiving region;
   a stand component having an upper edge, a lower edge, and inner and outer surfaces, and wherein the upper edge of the stand component is hingedly affixed to a bottom rear portion of the keyboard shell component;
   at least one stand retaining member having an upper end that is hingedly attached to a region within the stand-receiving region of the keyboard shell component, and a lower end attached to the inner surface of the stand component; and wherein the case facilitates the following two positions:
a transport position, wherein the stand component is received within the stand-receiving region of the keyboard shell component, with the stand retaining member in a folded state within the cavity, and
a deployed position, wherein the stand component extends outwardly from the bottom surface of the keyboard shell component, with the stand retaining member in a straightened condition, thereby maintaining the keyboard shell component at an angle relative to a support surface, resting on the front edge of the keyboard shell component and the lower edge of the stand component.

2. The case of claim 1, wherein each stand retaining member is made of a flexible material.

3. The case of claim 1, wherein each stand retaining member is hinged between the upper and lower ends of the stand retaining member.

4. The case of claim 1, wherein each stand retaining member is hinged between the upper and lower ends of the stand retaining member.

5. The case of claim 1, wherein the display portion of the portable electronic device snaps into the display shell component.

6. The case of claim 1, wherein the keyboard portion of the portable electronic device snaps into the keyboard shell component.

7. The case of claim 1, wherein the keyboard and display shell components are hinged.

8. The case of claim 1, wherein the keyboard and display shell components are peripherally the same size.

9. The case of claim 1, further including a structure for maintaining the stand component within the cavity of the keyboard shell component while in the transport position.

10. The case of claim 9, wherein the structure is magnetic.

11. The case of claim 1, wherein the upper edge of each stand component is hingedly affixed with a flexible material that extends through the keyboard shell component.

12. The case of claim 11, wherein the flexible material at least partially covers an outer surface of the stand component.

13. The case of claim 1, wherein the upper end of each stand retaining member is hingedly attached with a flexible material that extends through the keyboard shell component.

14. The case of claim 13, wherein the flexible material at least partially covers an outer surface of the stand retaining member.

15. The case of claim 14, wherein:
each stand retaining member is hinged between the upper and lower ends thereof; and
the flexible material at least partially covers an outer surface of each stand retaining member forms the hinge.

16. The case of claim 1, wherein the stand component is generally rectangular.

17. The case of claim 1, wherein the lower edge of the stand component includes a cut out forming a plurality of feet.

18. The case of claim 1, including a pair of spaced-apart stand retaining members.

* * * * *